Oct. 29, 1940.  C. W. RYERSON  2,219,534
TIRE COVER
Filed Aug. 1, 1933
FIG. 1
FIG. 2
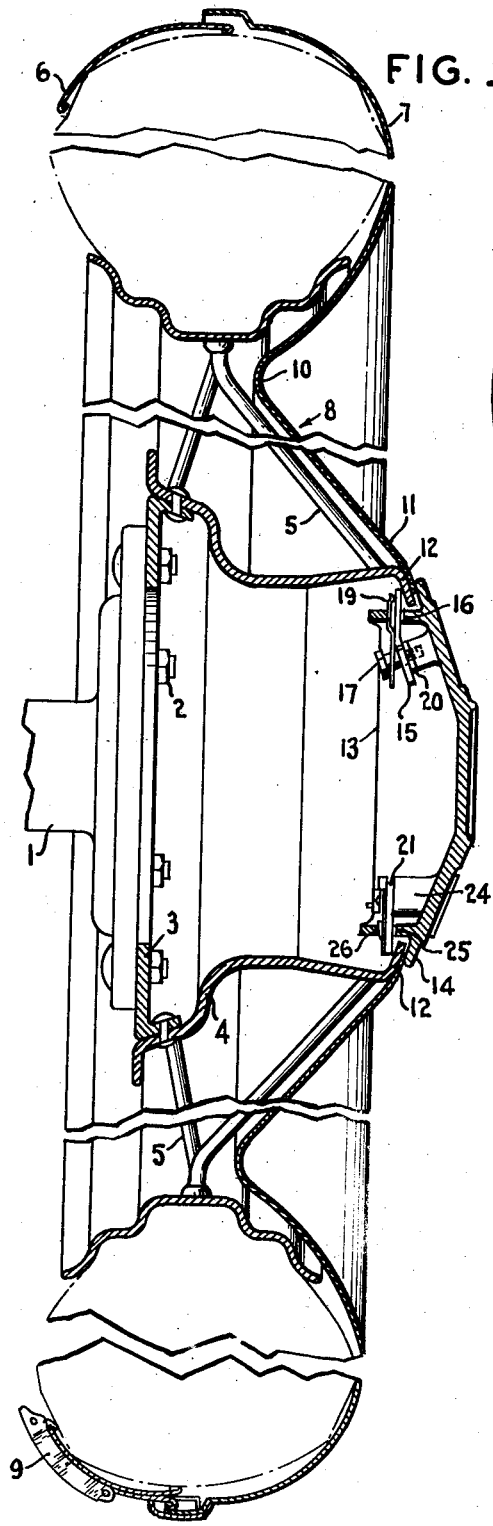
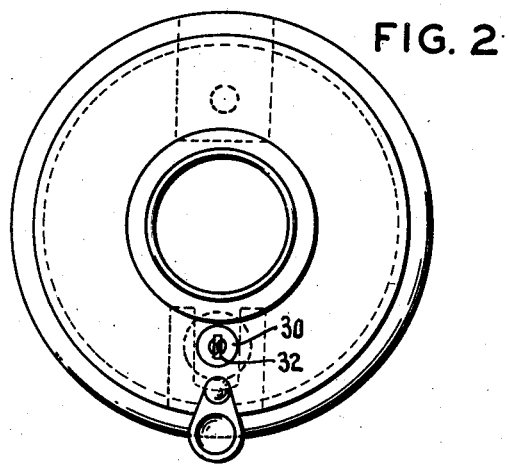
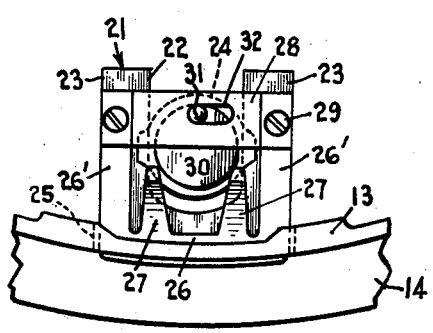
FIG. 3
INVENTOR
Creighton W. Ryerson
BY Ira J Adams
ATTORNEY Patented Oct. 29, 1940

2,219,534

UNITED STATES PATENT OFFICE 2,219,534

TIRE COVER

Creighton W. Ryerson, Jackson, Mich., assignor to Ryerson & Haynes, Inc., a corporation of Michigan Application August 1, 1933, Serial No. 683,190

2 Claims. (Cl. 150—54)

This application relates to tire covers and particularly covers for use on tires mounted on spare wheels.

It is the practice to mount spare wheels on a bracket bolted to the inside flange of the wheel with the nuts on the inside of the hub. It is one object of the invention to cover a portion of the tire and a front part of the wheel with a drum type cover having a central hub cap locked in position to prevent the theft of the wheel by unscrewing these nuts.

Another object of the invention is to use the cap as additional means for holding the cover in place on the spare wheel.

Other objects will appear in the following description, reference being had to the drawing in which:

Fig. 1 is a sectional elevation of the wheel and cover, the tire being shown in the outline only.

Fig. 2 is a side elevation of the central cap.

Fig. 3 is a rear view of the lock and associated parts.

Referring to Fig. 1, the bracket 1 on the car, for example, at the rear, supports the spare tire and cover assembly through bolts 2 fastened to a depending inside flange 3 riveted, welded or otherwise fastened to the wheel hub at 4 at a plurality of places. The rim 4 is positioned in respect to the hub by a plurality of wire spokes 5 or by other means and the spare tire, shown only in outline, is mounted on this rim.

The cover for the spare tire consists of a back band 6 circular in form in this illustration. The other part of the cover consists of a circular or toroidal cover 7 for the front side of the tire and a disc part 8 joined integrally therewith though, of course, the parts may be lock seamed or welded together, if desired. The two parts of the cover 6 and 7 are fastened in position on the tire by buckles or clasps 9 located at a plurality of places around the circumference. These clasps form no part of this invention as they are claimed in my copending application filed December 31, 1931, Serial No. 584,030, now Patent No. 2,189,182, dated Feb. 6, 1940.

The front disc part 8 of the drum cover is preferably curved at 10 to conform generally to the shape of the wheel and then extends outwardly at 11 to contact with the outside hub flange 12. The disc has a central opening in line with the opening in the hub for a hub cap 13. The opening in the disc is somewhat larger as illustrated in the drawing, but this may be varied in practice.

The cap 13 has an outside flange 14 adapted to rest against the disc part 11 adjacent the central hole or opening therein. A bar 15 contacts with the flange 12 of the wheel hub. This bar extends through a slot 16 in the inside rim of the cap or lid 13 and is mounted on the cap by a screw 17 threaded into a boss 18. A spring 19 also passes through the slot 16 and is held in place by the screw 17. The screw has a shoulder that abuts against a lock washer 20 as shown, so that it can be screwed tight while permitting freedom of movement of the bar 15 and spring 19 on the shank thereof. This spring mounting arrangement permits the bar 15 to resiliently hold the cap in place in cooperation with the lock to be presently described and at the same time clamps the disc of the cover firmly against the end flange of the hub.

A slide 21 has a cut-out portion 22 (see Figs. 2 and 3) thus forming two arms 23 that fit in a boss 24 integral with the cap 13. This slide is adapted to be moved in a slot 25 in the inside rim of the cap. A spring member 26 having arms 26' fitting over the arms 23 has two upstanding prongs 27 adapted to rest against the side of the slot 25 in locking position and force the slide 21 against the end flange 12 of the hub and thus clamp the hub flange and inner part 11 of the disc against the cap flange 14. The arms 26' of the spring are rigidly clamped to the arms 23 of the slide by a strap 28 and screws 29. The spring and slide are therefore formed to reciprocate together by a key operated cylinder 30 which has a pin 31 extending through a slot 32 in the strap 28. When the key is inserted in the keyway 32 (Fig. 2), which may be of the Yale type, the cylinder 30 is revolved and the slide is forced into locking position, as shown in Fig. 1, and at the same time the spring arms 27 bring the cap flange 14 firmly against the disc part 11 as previously described.

By the arrangement described, the cap can be securely locked in position on the spare wheel and no one can reach the nuts on the bolts to demount the spare wheel. Theft is therefore prevented. By the spring arrangements in the cap the parts are firmly held together, thus eliminating rattles.

To remove the hub cap one would insert the key and turn the cylinder until the slide 21 is retracted to the position shown in Fig. 3. The lower end of the cap in Fig. 1 may then be swung upwardly until the rim clears the hub flange and disc. The cap may then be moved downwardly until the lug or bar 15 clears the hub and flange. A wrench can then be readily inserted in the hub to demount the wheel. The tire cover can be readily removed from the wheel by separating the back band 6 from the other part 7 through release of the catches 9. The cover piece 7 may of course if desired be removed from the spare wheel before demounting the wheel.

Various modifications may be made without departing from the spirit of the invention.

Having described my invention, what I claim is:

1. In a multi-part tire cover, an arcuate section including side and tread covering portions, said side covering portion being provided centrally of the tire with means whereby it may be secured to the hub of the spare wheel in which the spare tire is mounted and an arcuate retaining ring for disposition at the other side of the tire and resiliently held in cooperation with said section, said ring being of a lesser depth than that of said section and having an inwardly extending rear tire side covering portion.

2. In a non-collapsible spare tire cover, front and rear arcuate and transversely curved sections each having a tread covering portion and a tire side covering portion with the side covering portion and said rear section of a lesser depth than that of the other side covering portion, the tire side covering portion of said front section being provided with means disposed centrally of the cover whereby said section may be secured to the hub of the wheel carrying said spare tire, said sections being provided with means to cause them to be resiliently urged into engagement with each other on the tire.

CREIGHTON W. RYERSON.